(12) United States Patent
Kang

(10) Patent No.: US 6,889,541 B1
(45) Date of Patent: May 10, 2005

(54) APPARATUS FOR MEASURING BORE DISTORTION OF A CYLINDER BLOCK

(75) Inventor: Ho Gyong Kang, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/747,883

(22) Filed: Dec. 29, 2003

(30) Foreign Application Priority Data

Oct. 22, 2003 (KR) .................... 10-2003-0073891

(51) Int. Cl.[7] .................... G01M 15/00; G01M 3/02; G01B 3/00

(52) U.S. Cl. .................... 73/119 R; 73/37.9; 33/542; 33/543; 33/550

(58) Field of Search .................... 73/119 R, 37.9, 73/37.7; 33/542, 543, 544, 544.1, 550

(56) References Cited

U.S. PATENT DOCUMENTS

| | | | | | |
|---|---|---|---|---|---|
| 3,279,079 | A | * | 10/1966 | Schiler | 33/556 |
| 4,167,066 | A | * | 9/1979 | Cooper et al. | 33/504 |
| 4,485,560 | A | * | 12/1984 | Fournier et al. | 33/544.1 |
| 5,205,047 | A | * | 4/1993 | Danielli | 33/542 |
| 6,243,962 | B1 | * | 6/2001 | Brock | 33/542 |
| 6,289,600 | B1 | * | 9/2001 | Watts | 33/542 |
| 6,536,266 | B1 | * | 3/2003 | Akimoto | 73/116 |

FOREIGN PATENT DOCUMENTS

JP 05-133702 5/1993

* cited by examiner

Primary Examiner—Michael Cygan
(74) Attorney, Agent, or Firm—Morgan Lewis & Bockius LLP

(57) ABSTRACT

Specific pressure and temperature conditions of an engine being measured are achieved by a compressor and a coolant controller, and bore distortion is measured as a gap between a rotation unit and a cylinder wall, wherein the measuring position may be vertically and angularly varied.

15 Claims, 2 Drawing Sheets

US 6,889,541 B1

APPARATUS FOR MEASURING BORE DISTORTION OF A CYLINDER BLOCK

CROSS-REFERENCE TO RELATED APPLICATIONS

This application claims priority of Korean Application No. 10-2003-0073891, filed on Oct. 22, 2003, the disclosure of which is incorporated fully herein by reference.

FIELD OF THE INVENTION

Generally, the present invention relates to an apparatus for measuring bore distortion of a cylinder block. More particularly, the present invention relates to an apparatus for measuring bore distortion of a cylinder block that can measure the bore distortion with respect to engine driving conditions including a temperature condition and a pressure condition of the cylinder block.

BACKGROUND OF THE INVENTION

In general, a bore of a cylinder block may be temporarily or permanently distorted by the fastening torque of a cylinder head bolt, coolant temperature, and a combustion pressure of a combustion chamber, etc. When such distortion of a cylinder is excessive, the engine may consume excessive lubricant.

Therefore, bore distortion should be precisely measured with respect to various engine operating conditions to assist in engine design.

According to an apparatus for measuring a bore distortion of a cylinder block of the prior art, bore distortion caused by a fastening torque of a cylinder head bolt was the only factor that could be precisely measured. Measurement of bore distortion of a cylinder caused by variations in coolant temperature showed a large error or the apparatus for measuring such bore distortion was very inefficient or uneconomical.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

The present invention relates to an apparatus for measuring bore distortion of a cylinder block with the capability of measuring the bore distortion with respect to engine driving conditions including temperature and pressure of the cylinder block.

An exemplary apparatus for measuring a bore distortion of a cylinder block according to an embodiment of the present invention includes a compressor for applying pressure to the bore of a cylinder block, a coolant controller for temperature control of the cylinder block, a slider unit mounted in the cylinder block slidably along a longitudinal direction of the cylinder block, a first driving unit for sliding the slider unit in the longitudinal direction of the cylinder block, a rotation unit rotatably mounted to an end of the slider unit, a second driving unit for rotating the rotation unit, at least one first sensor laterally mounted to the rotation unit for detecting a clearance between the bore and the rotation unit, and a second sensor for detecting the longitudinal position of the slider unit.

In another embodiment, the compressor comprises a pneumatic pump.

In still another embodiment, threads are formed on an exterior circumference of the slider unit.

The slider unit may be rotatably supported by a bracket mounted to the cylinder block.

In a still further embodiment, a through-hole is formed at the bracket such that an end of the slider unit is inserted thereto, and a nut holds the slider unit inserted through the through-hole.

In still another embodiment, the first driving unit includes a first drive motor, and a first driveshaft connected to a rotating shaft of the first drive motor, wherein the first driveshaft has threads on its circumference.

In a further embodiment, an insertion hole is formed through a center of the rotation unit such that an end of the slider unit is inserted thereto, a circular indentation is formed on a bottom side of the rotation unit, and teeth are formed on an interior wall of the indentation.

In a yet further embodiment, the second driving unit includes a second drive motor, and a second driveshaft connected to a rotating shaft of the second drive motor, wherein the second driveshaft has teeth on its circumference.

In a yet further embodiment, the at least one first sensor is provided as a pair thereof on an exterior circumference of the rotation unit.

In a yet further embodiment, the at least one first sensor is realized as a non-contact gap sensor for detecting a clearance between the rotation unit and an interior surface of the bore.

In still another embodiment, the second sensor is realized as a linear gauge contacting the slider unit for detecting a moved distance of the slider unit.

In a yet further embodiment, an apparatus further includes a pressure receiving plate disposed at the top of the slider unit, for receiving the pressure applied from the pressurizing device.

An O-ring may be disposed to an exterior circumference of the pressure receiving plate, for containing the pressure acting thereon.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

An embodiment of the present invention will hereinafter be described in detail with reference to the accompanying drawings.

Figure 1:
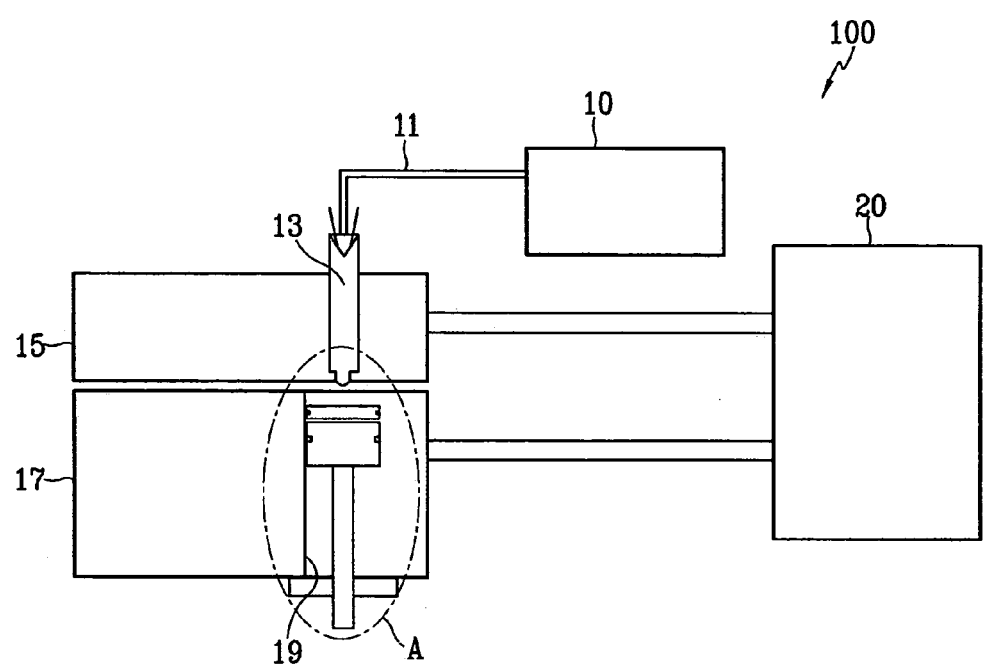
FIG. 1 illustrates an apparatus for measuring a bore distortion of a cylinder block according to an embodiment of the present invention.
Figure 2:
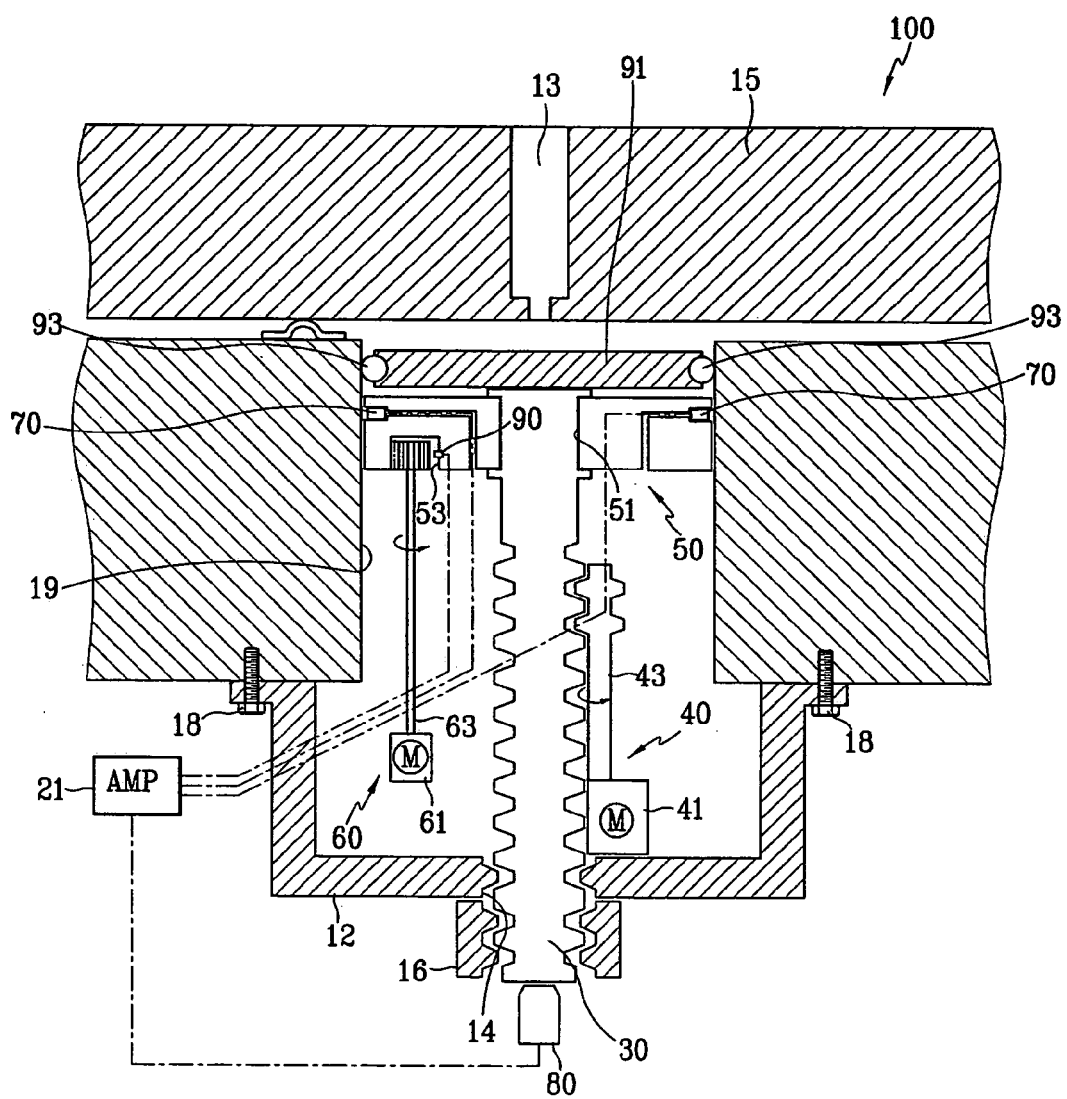
FIG. 2 is an enlarged sectional view of a portion A of FIG. 1.

FIG. 1 illustrates an apparatus for measuring distortion of a cylinder block bore according to an embodiment of the present invention, and FIG. 2 is an enlarged sectional view of a portion A of FIG. 1.

As shown in FIGS. 1 and 2, an apparatus 100 for measuring a bore distortion of a cylinder block 17 according to an embodiment of the present invention includes a compressor 10 for applying pressure to a bore 19 of the cylinder block 17, a coolant controller 20 for controlling temperature of the coolant supply to the cylinder block 17 for temperature control of the cylinder block 17, a slider unit 30 mounted in the cylinder block 17, the slider unit being slidable along a longitudinal direction of the cylinder block 17, a first driving unit 40 for sliding the slider unit 30 along the longitudinal direction of the cylinder block 17, a rotation unit 50 rotatably mounted to an end of the slider unit 40, a second driving unit 60 for rotating the rotation unit 50, at least one first sensor 70 laterally mounted to the rotation unit 50 for detecting a clearance between the bore 19 and the rotation unit 50, and a second sensor 80 for detecting longitudinal position of the slider unit 30. Reference number 21 indicates an amplifier for amplifying a signal.

The compressor 10 includes a pneumatic pump (not shown). The pneumatic pressure of the compressor 10 is supplied through a supply line 11 to a nozzle 13 connected at an end of the supply line 11. The nozzle 13 is mounted on a cylinder head 15 such that it may output the pneumatic pressure to the bore 19 of the cylinder block 17. The compressor 10 creates a pressure corresponding to a combustion pressure occurring in a normal operation of the engine.

The coolant controller 20 is disposed near the cylinder block 17 and the cylinder head 15. A coolant of a temperature corresponding to a coolant temperature occurring in normal operation of the engine is supplied to the cylinder block 17 and the cylinder head 15 by the coolant controller 20.

As shown in FIG. 2, the slider unit 30 is slidable in the cylinder block 17 along the longitudinal axis of the bore 19.

A bracket 12 is mounted at a lower end of the cylinder block 17, and the slider unit 30 is mounted to the bracket 12. In more detail, a through-hole 14 is formed at the bracket 12, and an end of the slider unit 30 is inserted thereto. A nut 16 holds the slider unit 30 inserted through the through-hole 14. Reference number 18 indicates a bolt for mounting the bracket 12 to the cylinder block 17.

Threads are formed on the exterior circumference of the slider unit 30. The first driving unit 40 is disposed adjacent to the slider unit 30. When operated, the first driving unit 40 slides the slider unit 30 along the longitudinal axis of the bore 19.

The first driving unit 40 includes a first drive motor 41 and a first driveshaft 43 connected to a rotating shaft of the first drive motor 41. The first driveshaft 43 has threads on its circumference that engage the threads of the slider unit 30. The engagement between the threads of driveshaft 43 and the threads of slider unit 30 cause the slider unit 30 to move along the longitudinal axis of the bore 19.

As described above, the rotation unit 50 is rotatably mounted to an end of the slider unit 40. An insertion hole 51 is formed through a center of the rotation unit 50, and an end of the slider unit 30 is inserted thereto. On a bottom side of the rotation unit 50, a circular indentation 53 is formed adjacent to the insertion hole 51. Teeth are formed on an interior wall of the indentation 53. The rotation unit 50 receives torque from the second driving unit 60 and can rotate thereby.

The second driving unit 60 includes a second drive motor 61 and a second driveshaft 63 connected to a rotating shaft of the second drive motor 61. The second driveshaft 63 has teeth on its circumference, and engages the teeth on the interior wall of the indentation 53 such that the rotation unit 50 may be gear-driven by the second driveshaft 63.

The at least one first sensor 70 is laterally mounted to the rotation unit 50. The at least one first sensor 70 is provided as a pair thereof on an exterior circumference of the rotation unit 50. The first sensor 70 is a non-contact gap sensor for detecting a clearance between the rotation unit 50 and an interior circumference of the bore 19.

Such a first sensor 70 rotates within the bore 19 together with the rotation unit 50, and can slide in the longitudinal direction of the bore 19 together with the rotation unit 50 such that bore distortion may be measured at every longitudinal position.

The second sensor 80 is a linear gauge contacting the slider unit 30 for detecting a moved distance of the slider unit 30.

A third sensor 90 is disposed within the indentation 53 of the rotation unit 50 such that angular position of the rotation unit 50 can be measured. The third sensor 90 is a gap sensor for detecting a rotation of threads formed at the second driveshaft 63.

A pressure receiving plate 91 is disposed at a top of the slider unit 30. The pressure receiving plate 91 is circularly shaped to fit to a cross-section of the cylinder. The pressure receiving plate 91 receives the pressure applied from the compressor 10.

An O-ring 93 is disposed on an exterior circumference of the pressure receiving plate 91. The O-ring 93 contains the pressure supplied by the compressor 10, preventing a leakage thereof between the pressure receiving plate 91 and the interior wall of the bore 19.

An operation of the apparatus for measuring bore distortion of a cylinder block according to an embodiment of the present invention is described hereinafter.

First, by operating the compressor 10 and the coolant controller 20, normal operating pressure and temperature conditions of the engine are simulated.

Subsequently, by operating the first driving unit 40, the slider unit 30 is moved to a target measuring position along the longitudinal direction of the bore 19.

And then, while rotating the rotation unit 50, bore distortion is measured by the first sensor 70 at a plurality of horizontal positions. Here, the second sensor 80 detects the longitudinal position of the slider unit 30 and the third sensor 90 detects the angular position of the rotation unit 50.

According to the above-described process, bore distortion may be measured at a variety of engine temperature and pressure conditions because the temperature and pressure may be changed by operating the compressor 10 and the coolant controller 20.

As described above, an apparatus for measuring a bore distortion of a cylinder block according to an embodiment of the present invention provides the following effects.

Bore distortion may be measured at a variety of engine temperature and pressure conditions.

In addition, costs for such a measuring apparatus may be lowered since the temperature and pressure may be changed by operating the compressor 10 and the coolant controller 20.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An apparatus for measuring bore distortion of a cylinder block, comprising:
   a compressor for applying pressure to a bore of the cylinder block;

a coolant controller for controlling the temperature of a coolant supply to the cylinder block for temperature control of the cylinder block;

a slider unit mounted in the cylinder block, the slider unit being movable along a longitudinal direction of the cylinder block;

a first driving unit for moving the slider unit along the longitudinal direction of the cylinder block;

a rotation unit rotatably mounted to an end of the slider unit;

a second driving unit for rotating the rotation unit;

at least one first sensor laterally mounted to the rotation unit, for detecting a clearance between the bore and the rotation unit; and a second sensor for detecting the longitudinal position of the slider unit.

2. The apparatus of claim 1, wherein the compressor comprises a pneumatic pump.

3. The apparatus of claim 1, wherein threads are formed on an exterior circumference of the slider unit.

4. The apparatus of claim 1, wherein the slider unit is rotatably supported by a bracket mounted to the cylinder block.

5. The apparatus of claim 3, wherein the slider unit is rotatably supported by a bracket mounted to the cylinder block.

6. The apparatus of claim 4, wherein:

a through-hole is formed at the bracket such that an end of the slider unit is inserted thereto; and a nut holds the slider unit inserted through the through-hole.

7. The apparatus of claim 1, wherein the first driving unit comprises:

a first drive motor; and a first driveshaft connected to a rotating shaft of the first drive motor, the first driveshaft having threads on its circumference.

8. The apparatus of claim 1, wherein:

an insertion hole is formed through a center of the rotation unit such that an end of the slider unit is inserted thereto;

a circular indentation is formed on a bottom side of the rotation unit; and teeth are formed on an interior wall of the indentation.

9. The apparatus of claim 1, wherein the second driving unit comprises a second drive motor; and a second driveshaft connected to a rotating shaft of the second drive motor, the second driveshaft having teeth on its circumference.

10. The apparatus of claim 1, wherein the at least one first sensor is provided as a pair thereof on an exterior circumference of the rotation unit.

11. The apparatus of claim 1, wherein the at least one first sensor is a non-contact gap sensor for detecting a clearance between the rotation unit and an interior circumference of the bore.

12. The apparatus of claim 10, wherein the at least one first sensor is a non-contact gap sensor for detecting a clearance between the rotation unit and an interior circumference of the bore.

13. The apparatus of claim 1, wherein the second sensor is a linear gauge contacting the slider unit for detecting the longitudinal position of the slider unit.

14. The apparatus of claim 1, further comprising a pressure receiving plate disposed at a top of the slider unit, for receiving the pressure applied by the compressor.

15. The apparatus of claim 14, further comprising an O-ring disposed on an exterior circumference of the pressure receiving plate, for containing a pressure acting thereon.

* * * * *